United States Patent
Dravnieks et al.

(10) Patent No.: US 10,346,162 B2
(45) Date of Patent: Jul. 9, 2019

(54) SELECTIVE INSTRUCTION REPLACEMENT FOR ASSEMBLY LANGUAGE PROGRAMS

(71) Applicant: International Business Machines Corporation, Armonk, NY (US)

(72) Inventors: John R. Dravnieks, Kardinya (AU); John R. Ehrman, Sunnyvale, CA (US); Dan F. Greiner, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 14/943,279

(22) Filed: Nov. 17, 2015

(65) Prior Publication Data

US 2017/0139682 A1 May 18, 2017

(51) Int. Cl.
*G06F 8/41* (2018.01)
*G06F 9/30* (2018.01)
*G06F 8/52* (2018.01)

(52) U.S. Cl.
CPC .................. *G06F 9/30* (2013.01); *G06F 8/52* (2013.01); *G06F 8/443* (2013.01)

(58) Field of Classification Search
CPC ............... G06F 8/315; G06F 8/52; G06F 9/30
See application file for complete search history.

(56) References Cited

U.S. PATENT DOCUMENTS

| | | | |
|---|---|---|---|
| 7,725,887 B2 | 5/2010 | Wu et al. | |
| 8,561,037 B2 | 10/2013 | Wallach et al. | |
| 2006/0248262 A1* | 11/2006 | Lin | G06F 8/447 711/3 |
| 2007/0094639 A1 | 4/2007 | Kefford et al. | |
| 2010/0287359 A1 | 11/2010 | Norden | |
| 2012/0110544 A1* | 5/2012 | Novak | G06F 8/20 717/101 |
| 2014/0143521 A1* | 5/2014 | Doing | G06F 9/382 712/205 |

OTHER PUBLICATIONS

"IBM High Level Assembler for z/OS & z/VM & z/VSE Language Reference", SC26-4940-05, IBM, Release 6, Jul. 2008,450 pages.
"z/Architecture Principles of Operation", SA22-7832-10, Eleventh Edition, IBM, Mar. 2015, 1732 pages.

* cited by examiner

*Primary Examiner* — Wei Y Zhen
*Assistant Examiner* — Amir Soltanzadeh
(74) *Attorney, Agent, or Firm* — Alexander G. Jochym

(57) ABSTRACT

An approach for replacement of instructions in an assembly language program includes computers receiving an assembly language program and user selections of one or more classes of instructions. The approach includes computers reading a statement in the program and selecting a class of instructions from the user selections. The approach includes computers selecting a first group of instructions in the selected class and determining that the statement is an instruction in the first group of instructions. The approach includes computers reading a number of statements that match a number of instructions in the first group of instructions including the statement and replacing the first group of instructions with a group of replacement instructions when the read number of statements match the number of instructions in the first group of instructions. Furthermore, the approach includes computers sending the group of replacement instructions to output to update the assembly language program.

20 Claims, 7 Drawing Sheets

CLASS 1 INSTRUCTIONS (EXAMPLE)

SHORT TO LONG DISPLACEMENT
(12 BIT UNSIGNED TO 20 BIT SIGNED DISPLACEMENT)

| FROM | TO | INSTRUCTION |
|------|-----|-------------|
| A | AY | ADD |
| AH | AHY | ADD HALFWORD |
| AL | ALY | ADD LOGICAL |
| C | CY | COMPARE |
| N | NY | AND |
| NI | NIY | AND |

FIG. 2A

CLASS 2 INSTRUCTIONS (EXAMPLE)

ELIMINATING UNNECESSARY BRANCH INSTRUCTIONS ("C" TESTS FOR A
CONDITION AND "15-C" TESTS FOR THE COMPLEMENTARY CONDITION)

202A      202B      202C

| FROM | TO | INSTRUCTION |
|---|---|---|
| BC  c, X<br>BC  15-c, Y<br>X    ... | BC  15-c, Y | BRANCH ON CONDITION<br>NEXT INSTRUCTION |
| BC  c, X<br>BC  15, Y<br>X    ... | BC  15-c, Y | BRANCH ON CONDITION<br>NEXT INSTRUCTION |

WHERE: X AND Y NAMES OF AREAS OF MEMORY IN THE
PROGRAM. "15" INDICATES AN UNCONDITIONAL BRANCH

FIG. 2B

CLASS 3 INSTRUCTIONS (EXAMPLE)

ELIMINATING UNNECESSARY REGISTER CLEARING
(SUBTRACT REGISTER "SR r, r " SUBTRACTS REGISTER r FROM ITSELF)

203A      203B      203C

| FROM | TO | INSTRUCTION |
|---|---|---|
| SR  r, r<br>LH  r, Y | LH  r, Y | SUBTRACT REGISTER, (SR)<br>LOAD HALF WORD (LH) |
| SR  r, r<br>ICM  r, B '0011', Y | LLH , Y | SUBTRACT REGISTER (SR)<br>INSERT CHARACTERS UNDER MASK (ICM) |

WHERE: X AND Y ARE VALUES
       B' 0011' IS A REGISTER POSITION INDICATOR FOR 2 BYTES

FIG. 2C

SELECTIVE INSTRUCTION REPLACEMENT FOR ASSEMBLY LANGUAGE PROGRAMS

BACKGROUND OF THE INVENTION

The present invention relates generally to the field of assembly language programming and more particularly to the selective replacement of instructions in an existing assembly language program.

Assembly language is a low-level programming language converted into executable machine code by a utility program referred to as an assembler and the conversion process is referred to as assembly, or assembling the code. Assembly language uses a symbolic name or a mnemonic, which is a memory aid, to represent each low-level machine instruction or operation. Instructions in machine code or binary code are a composed series of eight binary digits or bits, which are one of two values, either a one or a zero (e.g., 01100001). In computer assembly language, an instruction mnemonic is an abbreviation for an operation. Assembly language typically uses an operation code (i.e., opcode) represented by an instruction mnemonic and one or more operands or data elements representing the location or value of the particular elements of data. An instruction mnemonic is entered in the operation code field of each assembler program instruction.

Typical operations require one or more operands in order to form a complete instruction, and most assemblers can therefore take labels, symbols, and expressions as operands to represent addresses and other constants, freeing the programmer from tedious manual calculations. Data locations include main storage, registers, or the instruction, which is known as immediate data that is included in the instruction. Registers are specific areas set aside in the processing unit of the computer. Typically, a register can hold one word or 32 bits of data and is needed for certain arithmetic operations and other uses in programming.

An assembler is a program that creates object code by translating combinations of instruction mnemonics and operands into their numerical or binary machine code equivalents for instructions. The object code is a binary machine code or a series of ones and zeros providing machine-readable instructions to the computer that is translated from the source code, which is a collection of computer instructions written using human-readable computer language or text. Although there has been some movement for standardization, different assemblers and different processor architectures often provide a variety of different mnemonics in the various assembly languages supporting the different assemblers and processors.

SUMMARY

Embodiments of the present invention disclose a method, a computer program product, and a system for replacement of instructions in an assembly language program. The method includes one or more computers receiving an assembly language program and one or more user selections of one or more classes of instructions. The method includes one or more computers reading a statement in the received assembly language program and selecting a class of instructions of the one or more user selections. Additionally, the method includes one or more computers selecting a first group of instructions in the selected class of instructions and determining that the statement is an instruction in the first group of instructions. Next, the method includes one or more computers reading a number of statements that match a number of instructions in the first group of instructions including the statement. The method includes one or more computers replacing the first group of instructions with a group of replacement instructions when the read number of statements match the number of instructions in the first group of instructions. Furthermore, the method includes one or more computers sending the group of replacement instructions to output, the output used to update the assembly language program.

BRIEF DESCRIPTION OF THE DRAWINGS

FIGS. 2A, 2B and 2C depict examples of possible classes of existing instructions for selection by a user, in accordance with an embodiment of the present invention;

DETAILED DESCRIPTION

Embodiments of the present invention recognize that architectures of computer processors often evolve over time, and programs written in an assembler language for the capabilities of previously manufactured computer processors can benefit from revised or updated assembly language instructions that can utilize improved computer processor capabilities. Updated assembly language instructions utilize updated or enhanced attributes of more recent processors with better performance, updated functions, and updated and/or improved capabilities. Assembly language programs are generally written as sequences of statements declaring individual instructions. The sequential instructions can be difficult to modify or update in order to take advantage of updated, more efficient processor instructions since assembly language program modification can require detailed examination of each instruction sequence to determine if the instruction or the instruction sequence is a candidate for replacement by one or more updated, more efficient instructions. Embodiments of the present invention recognize that programmers may choose not to make an effort to benefit from available processor enhancements due to the difficulty associated with modifying assembly language instructions or, the programmers may attempt to convert the entire assembly language program to another programming language such as a high-level program language. Embodiments of the present invention recognize that modifying an assembly language program or converting the assembly language program to a new language can be tedious, error-prone, and expensive.

Embodiments of the present invention provide a technique for modernizing or updating existing assembler language programs to utilize updated capabilities and functions provided by evolving computer processor technologies. Embodiments of the present invention provide a method and a process for automatically upgrading or modifying existing assembler language programs to utilize the evolving computer processor capabilities of the processor executing the program by selectively changing existing instructions or classes of instructions to updated, more efficient, and more powerful instructions. Embodiments of the present invention provide an automated method for programmers to apply selective changes to the assembly language program instructions with very little effort or programming time.

Figure 1:
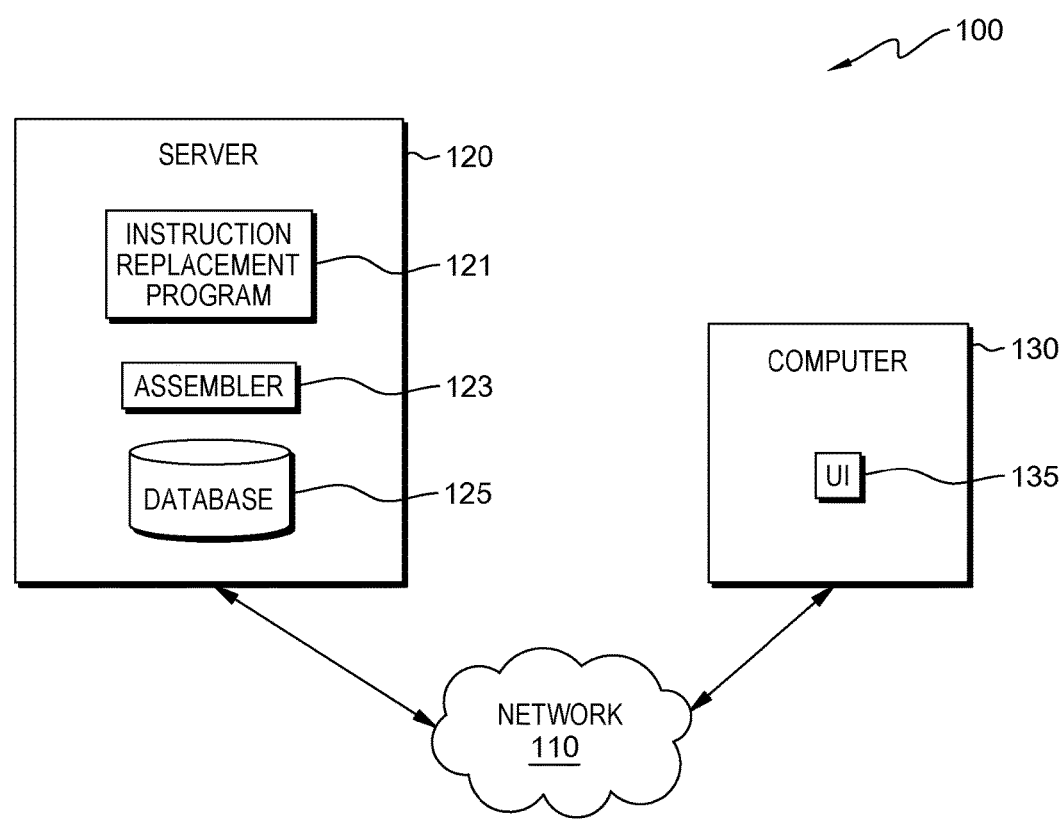
FIG. 1 is a functional block diagram illustrating a distributed data processing environment, in accordance with an embodiment of the present invention.

Implementation of embodiments of the invention may take a variety of forms, and exemplary implementation details are discussed subsequently with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 120, computer 130 interconnected over network 110. Network 110 can be, for example, a telecommunications network, a local area network (LAN), a virtual LAN (VLAN), a wide area network (WAN), such as the Internet, or a combination of these, and can include wired, wireless, virtual, or fiber optic connections. Network 110 can include one or more wired and/or wireless networks that are capable of receiving and transmitting data, voice, and/or video signals, including multimedia signals that include voice, data, and video information. In general, network 110 can be any combination of connections and protocols that will support communications between server 120, computer 130 and other computing devices (not shown) within distributed data processing environment 100.

Server 120 can be a mainframe computer, a management server, a web server, a mobile computing device, or any other electronic device or computing system capable of receiving, sending, storing, and processing data. In another embodiment, server 120 can be a laptop computer, a tablet computer, a netbook computer, a personal computer (PC), a desktop computer, a personal digital assistant (PDA), a smart phone, or any programmable electronic device capable of communicating with computer 130 and other computing devices (not shown). In some embodiments, server 120 represents a computing system utilizing clustered computers and components (e.g., database server computers, application server computers, etc.) such as used in a cloud computing environment that act as a single pool of seamless resources when accessed within distributed data processing environment 100. In various embodiments, each of the programs, applications, and databases on server 120 and computer 130 can reside on various other computing devices with distributed data processing environment 100, provided each has access to information and storage for implementation and operations of the present invention via network 110. Server 120 includes instruction replacement program 121 and assembler 123. Server 120 sends and receives data from computer 130 and other computing devices (not shown in FIG. 1) via network 110.

Instruction replacement program 121 provides a user the ability to specify or select one or more classes of instructions or configured classes of instructions used in an existing assembly language program that can be replaced with one or more predefined replacement instructions, which simplify existing instructions or use more recent assembly language instructions, capitalizing on improved processor functions. Instruction replacement program 121 receives an existing assembly language program (e.g., from a user) used as a source for instruction replacement program 121. Instruction replacement program 121 outputs an updated assembly language program that includes statements or other code not replaced in the existing assembly language program (e.g., source), groups of instructions in the existing assembly language program not identified for replacement, and groups of instructions replaced in the existing assembly language program by instruction replacement program 121. Additionally, instruction replacement program 121 provides the user with the ability to select one or more groups of instructions in the class of instructions for replacement. Examples of potential classes of instructions are depicted and discussed later in more detail in FIGS. 2A and 2B. The classes of instructions may include one or more instructions in an existing assembly language, one or more groups of instructions in an existing assembly language, the associated replacement instructions, and the processing instructions or a class routine used in the instruction replacement for the specific class of instructions. A group of instructions is a sequence of one or more instructions that are used in the execution of a desired function or programming objective. The one or more predefined replacement instructions replace existing assembly instructions to improve the efficiency of the assembly language program and access new or updated functions in the processor.

The classes of instructions or configured classes of instructions, for the purpose of the embodiments of the present invention, are instructions that are classified and grouped together as a class of instructions in instruction replacement program 121. The class of instructions may be configured as a default in instruction replacement program 121 or configured as a user selected custom class of instructions. A class of instructions may be pre-configured in instruction replacement program 121. A class of instructions may be one or more groups of instructions determined for configuration in a class based, at least in part, on one or more of the following: groups of instructions performing similar functions (e.g., add, combine, or similar branch instructions), groups of commonly used instructions, groups of instructions targeted for a processor architecture on which the instructions will run, or other criteria for configuring one or more groups in a class of instructions. In various embodiments, instruction replacement program 121 receives one or more classes of instructions for instruction replacement based on user selections of a class. Instruction replacement program 121 may be configured to provide the user, for example, with a pull down menu, icons, buttons, or a command line for an input that allow the user to select via UI 135 on computer 130 one or more classes of instruction. For example, a user may select class XX, which is a pre-configured class of instructions. In this example, Class XX may contain six existing instructions for replacement that are used in the same processor architecture.

While various embodiments of the present invention provide pre-set or pre-configured classes of instructions in instruction replacement program 121 for user selection, in some embodiments, instruction replacement program 121 provides the user the ability to select one or more groups of instructions to create one or more custom classes of instructions for instruction replacement. One or more groups of instructions may be configured in instruction replacement program 121 as a custom class of instructions. As with a pre-set configured class of instructions in instruction replacement program 121, the user may select one or more groups of instructions in the custom class of instructions for replacement.

The user configured custom class of instructions may be a user determined grouping of instructions in an existing a assembly language as selected by a user or programmer. The user configured custom class of instructions includes, in addition to the user selected instructions or groups of instructions; the replacement instructions, which may be groups of replacement instructions, and any required instructions for processing the instructions during replacement (e.g., a class routine for the custom class). For example, a user may select an icon, a button, an item in a pull-down menu, or type in a command such as "create a custom class" to initiate the creation of a custom class of instruction. The user on UI 135 may type in, select from another screen, or drag in the instructions to be included in the custom class of instructions and any additional user desired information. The user-configured custom class of instructions may be stored, for example, in persistent storage 508 in computer 130, as discussed with reference to FIG. 5 or in database 125. In an embodiment, the user operating on computer 130 sends the configured custom class of instructions via network 110 to instruction replacement program 121 and database 125 on server 120. In an alternate embodiment, instruction replacement program 121 can retrieve the user-configured custom class of instructions via network 110.

In an embodiment, a user selected custom class of instructions includes one or more user selected instructions in an existing assembly language program, which are one or more user selected groups of instructions, the replacement instructions or the groups of replacement instructions where a group of instructions may be one or more instructions, and any additional processing or instruction processing for a class (i.e., class processing) required to replace the selected instructions in the user selected custom class. For example, the user may include in the selected custom class of instructions a grouping of the instructions that are heavily used in the existing program and/or other similar programs. In one embodiment, a class of instructions or a custom class of instructions does not include a class routine for instruction replacement. In some embodiments, the user-configured custom class of instructions may include a user generated name, for example, "load register with short to long" created on computer 130 and may be sent to database 125 via network 110. The user operating computer 130 sends the selected custom class of instructions to database 125 on server 120. Instruction replacement program 121 on server 120 receives from computer 130 the user selected custom class of instructions that are sent to database 125, or to another database (not depicted in FIG. 1) via network 110.

Instruction replacement program 121 matches the code used in the instructions in the existing assembly language to the code of instructions in the user selected class of instructions for replacement. When instruction replacement program 121 identifies or determines that the code in an instruction or in a group of instructions in the existing assembly language program matches the code of a user selected instruction or a group of instructions in a user selected class of instructions, then instruction replacement program 121 replaces the instruction or the group of instructions in the existing assembly language program with the associated, updated replacement instruction or with a group of associated, updated replacement instructions. The replacement instructions with updated or new assembly language functions provide the capability to utilize improvements in processor technology for improved assembly program performance.

In addition to processing individual user selected instructions or groups of instruction for replacement, various embodiments of instruction replacement program 121 provides the user the ability to select classes of instructions for instruction replacement. The one or more instructions or one or more groups of instructions may be configured in instruction replacement program 121 as a pre-set or configured class of instructions. In various embodiments, the grouping or the determination of the instructions to be included in a class is performed based on one of the following methods: by instructions performing similar functions (e.g., add, combine, or similar branch instructions), by commonly used instructions, by processor architecture, or by other programmer determined criteria. In various embodiments, the instructions combined (e.g., by instructions performing similar functions) are preset or configured in a class of instructions in instruction replacement program 121. For example, instruction replacement program 121 may be configured to provide the user with a pull down menu, icons, buttons, or a command line for class input that allow the user to select via UI 135 one or more classes of instruction for replacement. The user may select class XX, which is a pre-configured class of instructions. In this example, Class XX may contain six existing instructions for replacement that are used for the same processor architecture.

In various embodiments, instruction replacement program 121 is executed once or more than once on any of the following: a line of code, a routine, a subset of an assembly program, or an assembly program. Instruction replacement program 121 can process a program iteratively (e.g., can update the program iteratively). In other words, instruction replacement program 121 may be executed more than once (i.e., multiple times) on a program using one or more user selections for instruction replacement or with the same user selection.

In various embodiments, instruction replacement program 121 receives a selection from the user of the summary information a user would like to see upon completion of updating or replacing instructions. The summary information selected by the user on computer 130 may include an assembly language program size before replacement and program size after replacement, for example. The summary information for selection is discussed later in more detail with reference to FIG. 3. In one embodiment, instruction replacement program 121 queries assembler 123 for user selected summary information after the updated program has completed the assembly process. In an embodiment, instruction replacement program 121 receives from UI 135 a user selection of one or more of the following: one or more groups of instructions for replacement, one or more classes of instructions for replacement, one or more descriptions for the replacement instructions, one or more summary selections, and the selection of the type of processor architecture.

Additionally, in various embodiments, instruction replacement program 121 provides the ability for the user to specify the types of descriptive or explanatory information provided with the replacement instructions. For example, instruction replacement program 121 may include an option for the user to select or add comments such as used in annotating the code with the replacement instructions.

While depicted as a program on server 120, the code and routines of instruction replacement program 121 may be included as a plug-in to assembler 123, as a pre-processor to assembler 123, or as a code and routines embedded in assembler 123. In an embodiment, instruction replacement program 121 resides on computer 130, on another computing device or on multiple computing devices (e.g., a cloud environment) within distributed data processing environment 100.

Assembler 123 resides on server 120. As known to one skilled in the art, assembler 123 provides the known functions and processes commonly performed by an assembler. Assembler 123 translates a symbolic language such as assembly language with a mnemonic or a symbolic name representing the opcode (e.g., operation code) of the instruction and the operand (e.g., data location) into machine instructions such as binary machine instructions or binary machine code. In one embodiment, the code and routines of instruction replacement program 121 reside in assembler 123 as a plug-in. For example, code and routines for the execution of associated routines for instruction replacement, summary compiling, sending of summaries, and for user selection of pre-set classes or custom classes, of instructions to create classes, of processor type, and of summary selection would be executed in assembler 123 using the plug-in. In another embodiment, the code and routines providing the function of instruction replacement program 121 are incorporated into assembler 123. Upon executing the translation of assembly language code into machine instructions, assembler 123 may store the updated assembly language program in database 125 on server 120, and sends the program to the user on computer 130 or to another computing device (not shown in FIG. 1).

Database 125 resides on server 120. Database 125 receives and stores data such as user-configured custom classes of instructions generated by a user on UI 135 in computer 130. Additionally, database 125 may send and receive from instruction replacement program 121 and computer 130 user selections of classes of instructions, created custom classes, user selection of summaries of instruction replacements, compiled summaries of instruction replacement, and assembly language programs such as updated assembly language programs in addition to other information received from the user and instruction replacement program 121. In various embodiments of the present invention, the information and data stored in database 125 may be stored in a single database, or on one or more databases located elsewhere in distributed data processing environment 100, accessible via network 110.

In the exemplary embodiment, computer 130 is a client to server 120. Computer 130 includes UI 135. Computer 130 may be a notebook, a laptop, a personal digital assistant, a tablet, a smart phone, wearable computing device, or other computing system connected to server 120 via network 110. Computer 130 sends and receives data and information such as code, routines, programs, or instructions to and from instruction replacement program 121 on server 120 via network 110. Computer 130 may send and receive data and information from server 120 and assembler 123 via network 110. Computer 130 may send and receive data from other computing devices (not shown). Instruction replacement program 121 can display on user interface (UI) 135 the instructions included in the class of instructions to the user when the user selects an option such as view classes of instructions using an icon, a button, a pull down menu, or other known user selection method on UI 135. While computer 130 is depicted as a single client device, multiple computing devices or client devices may communicate and exchange data with instruction replacement program 121 and assembler 123 on server 120 via network 110. UI 135 on computer 130 is a user interface providing an interface between a user of computer 130 and server 120, and enables a user of computer 130 to interact with programs and data on server 120, computer 130, and other computing devices (not shown).

UI 135 may be a graphical user interface (GUI), an active area or line for text inputs, a web user interface (WUI), or other type of user interface and can display text, documents, user options, application interfaces, and instructions for operation such as user selection of classes of instructions for instruction replacement or a user selection of summary data to receive from instruction replacement program 121, and includes the information that a program may present to a user. In an embodiment, UI 135 receives a user input via a touch screen, a key board, a mouse, a display, an audio, visual or motion sensing device or other peripheral device standard in computer devices. UI 135 may be used to by a user to send code, a program, a user selection, or generate a query and to display to the user data, information, or received from instruction replacement program 121 or assembler 123. For example, a user may view on UI 135 a summary of instruction replacements and instruction promotions occurring in an assembly language program as a result of the execution of instruction replacement program 121.

Prior to executing instruction replacement program 121, the program 121 is pre-set or configured with the groups of instructions that can be selected to be replaced and the one or more instructions used to replace the selected group or groups of instructions. In addition, instruction replacement program 121 is pre-set or configured with one or more classes of instructions and/or any user selected custom classes of instructions. Examples of existing assembly language groups of instructions for replacement and the one or more instructions, which may be used to replace the existing groups of instructions are discussed below. Some examples of possible classes of instructions for replacement are depicted and discussed in FIGS. 2A, 2B, and 2C. The examples of possible classes of instruction for replacement may include one or more groups of instructions. The examples of possible classes of instructions which include one or more groups of instructions for replacement are pre-set or pre-configured in instruction replacement program 121 are illustrated in FIGS. 2A, 2B, and 2C. The groups of instructions and the pre-configured classes of instructions for replacement that include user selected custom classes of instructions are stored in database 125 for the operation of the invention as illustrated and discussed in detail later with reference to the program flow chart (i.e., FIG. 3).

In various embodiments, instruction replacement program 121 provides the user with the ability to specify a target architecture to aid in the user selection of the appropriate replacement instructions. The processor architecture on which the assembly language program will run with the updated replacement instructions (or the updated class of replacement instructions) may be called the target architecture for the purposes of embodiments of the present invention. For example, a target architecture may be IBM z13®, which is an IBM mainframe architecture. The replacement instructions used in the updated assembly language program may be executed on a processor newer than the processor for which the existing instructions in the existing assembly language program were originally written. However, while the processor is newer than the original processor, the newer processor executing the replacement instructions may not support the most recent instructions in instruction replacement program 121.

Instruction replacement program 121 is configured or pre-set with the one or more groups of instructions to replace the existing selected groups of instructions in the existing assembly language program that correlate to the processor architecture on which the replacement instructions are executed. In this example, instruction replacement program 121 is configured to provide to the user a selection of target architectures prior to execution of instruction replacement program 121. Instruction replacement program 121 may provide to the user a selection or a list of target architectures with a pop-up, a pull-down menu, an icon or symbol, or another known selection method utilized in a computer interface such as UI 135.

Based on the user's selection of the target architecture, instruction replacement program 121 provides the replacement instructions best suited to, or that match the processor on which, the assembly language program with the updated replacement instructions will run. The target processor architecture on which the enhanced assembly language program with the replacement instructions will be executed may affect the replacement instructions that may or may not be included in each class of instructions.

Some examples of assembly language instructions or groups of instructions that may be replaced using instruction replacement program 121 are illustrated below. The examples provided are for illustrative purposes only, and embodiments of the present invention are not intended to be limited to these examples. While the examples of replacement instructions illustrated below are individual replacement instructions, the replacement instructions may be a group of replacement instructions. The examples are illustrated using IBM® High Level Assembler Language however, as recognized by one skilled in the art, the methods and concepts illustrated with the examples of types of replacements for instructions can be applied in other assembly languages.

In various embodiments, instruction replacement program 121 is used to streamline programs by combining two or more instructions into fewer instructions with the same functionality. For example, a group of two existing instructions may be combined into one replacement instruction for improved program efficiency. Some existing assembly language programs may load a value into a register to test the value's sign, which requires two instructions; these instructions may be replaced by a single instruction to both load and then test the sign. Instruction replacement program 121 can be configured to replace the two existing instructions with the updated assembly instruction to load and to test the sign when the user selects these instructions for replacement. An example of instructions for this could be "L r,X", an instruction to load a value, X from memory into a register r, and "LTR r,r", an instruction to test the value by the Load and Test (LTR) instruction that can be replaced with a single instruction, and "LT r,X", an instruction that loads value from X and tests the sign of X. In this example, the updated processors combine the two instructions (i.e., load, and load and test) into a single instruction (LT) that performs the same load and test function (loads value from X and tests the sign of X).

Similarly, an existing assembly language program may clear a register before loading data from memory, thus using a group of two instructions. In this example, the group of instructions that are the two instructions to clear and, then load a register may be promoted to a single replacement instruction by instruction replacement program 121 when this instruction replacement option for existing assembly language instructions is selected by the user.

Figure 6:
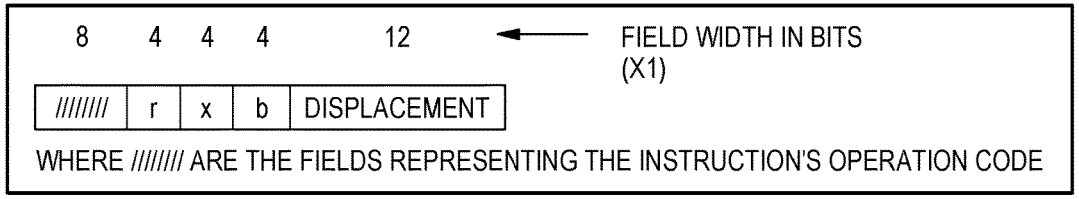
FIG. 6 is an example of assembly language instruction for a constant base register with an unsigned 12-bit displacement, in accordance with an embodiment of the present invention.

In another embodiment, instruction replacement program 121 replaces the groups of existing assembly language instructions when the capabilities of the existing instructions and programs just meet or minimally provide addressability needs of an existing assembly language program. Addressability is the capacity for an entity (e.g., a value, a location, etc.) to be targeted and located. To be addressable, an entity must be uniquely identifiable, typically using an alphanumeric string. Improved capabilities of processors allow for better addressability. For example, in many existing assembly language programs, groups of instructions address memory operands by using base-displacement addressing, typically with a constant base register value and as illustrated in FIG. 6 for an instruction with an unsigned 12-bit displacement.

Figure 7:
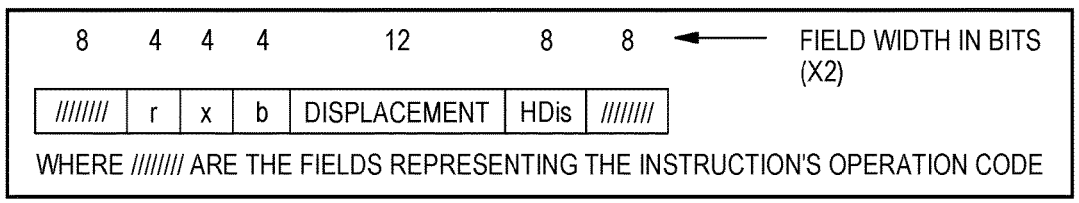
FIG. 7 is an example of assembly language code with a signed 8-bit high-order extension of the 12-bit base-displacement, in accordance with an embodiment of the present invention.

The existing assembly language program may find that the range of addressability of an instruction with a 12-bit displacement is insufficient (or barely sufficient) to reference an operand. By replacing the unsigned 12-bit base-displacement addressing field of an instruction with a 20-bit base-displacement addressing field (e.g., HDis) of an equivalent instruction as shown in FIG. 7, the available addressing range in the assembly language program is increased by a factor of 256. The assembly language program using the updated instructions with larger displacement addressing fields simultaneously supports both positive and negative displacements.

In this replacement instruction, (illustrated in FIG. 7), HDis is a signed 8-bit high-order extension of the 12-bit base-displacement, thus increasing the effective displacement for the instruction to a 20 bit displacement.

In another embodiment, very large programs with significant addressing needs or requirements (e.g., greater than 16 bits) benefit in terms of improved performance when larger addressing fields are used to replace existing groups of assembly language instructions by instruction replacement program 121. Improved computer processors may provide the capability for larger addressing fields that can be utilized with updated or replacement assembly language instructions when selected to replace existing groups of instructions by a user executing instruction replacement program 121. For example, a very large existing assembly language program in which 20-bit base-displacement addressing fields or 16-bit relative-immediate offset addressing fields could be sufficient for some parts of the program but are just meeting the requirements or are inadequate to reference other parts of the assembly language program. In this example, the existing program can benefit by replacing the existing instructions with the 20-bit signed displacement to a replacement assembly language instruction with equivalent function and a 32-bit relative address field, thus increasing the addressing range of the instruction by a factor of 8192.

Figure 8:
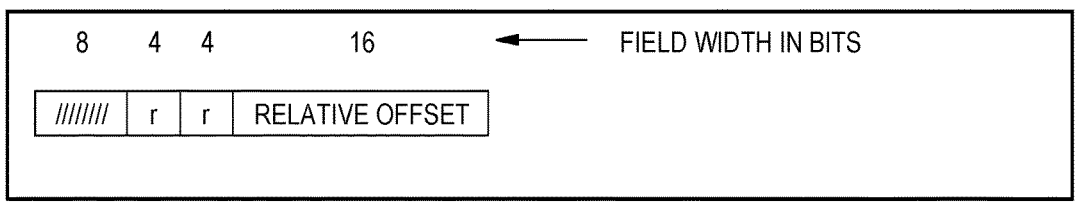
FIG. 8 is an example of assembly language instruction with a 16-bit relative-immediate offset addressing field, in accordance with an embodiment of the present invention.
Figure 9:
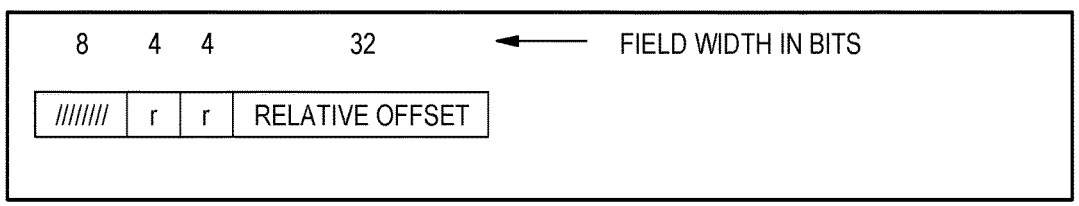
FIG. 9 is an example of assembly language instruction with a 32-bit relative-immediate offset field, in accordance with an embodiment of the present invention.

The existing instruction in FIG. 8 with a 16-bit relative-immediate offset addressing field may be replaced with an instruction using a 32-bit relative-immediate offset field that provides a greatly increase addressing range as depicted in FIG. 9.

In yet another embodiment, extended mnemonic instructions are used to improve instruction readability providing better programmer understanding of the instruction. For example, an existing based branch instruction such as BC (Branch on Condition) below may be replaced with a simpler "Branch on Condition" instruction also known as a "jump" instruction such as JE (Jump on Equal). For example, instruction "BC 8, X" may be replaced with instruction "JE X".

Replacing groups of based branch instructions similar to the BC instruction with equivalent relative branch instructions can improve instruction readability. Replacement of instructions like "BC 8,X" with simplified instructions such as "JE X" as illustrated above cannot be done for existing instructions with a nonzero index field. Certain instructions support a second register for addressing, called an index register. The instruction field containing the index value is designated by x in diagrams X1 and X2. The field specifying such an index register must be nonzero to specify an indexing operation; if the field is zero, no index register is used. Some replacement instructions just described, such as the "jump" instructions just described, do not support an index register field, and therefore cannot be used to replace instructions with a nonzero index field. Instruction replacement program 121 includes software algorithms, as illustrated below in examples of processing instructions for various classes of instructions (e.g., Class 1, Class 2, and Class 3 discussed below with reference to FIGS. 2A, 2B and 2C), that identify if an existing instruction utilizes an index. When the existing instruction utilizes an index, instruction replacement program 121 does not perform a replacement on the instruction.

In some embodiments, instruction replacement program 121 replaces existing groups or combinations of branch instructions with a single branch instruction providing the same functionality. In an embodiment, instruction replacement program 121 replaces combinations of branch instructions with more than one branch instruction (e.g., a group of branch instructions).

In another embodiment used for branching when groups of conditional branch instructions use the address of the target or replacement instruction of a branch that is calculated based on register contents or other conditions, instruction replacement program 121 is configured to allow a user to use a relative offset to calculate the address of the target or replacement instruction. For example, this embodiment for branching may be applied for groups of conditional branch instructions where the address of the replacement instruction of a branch is calculated based on register contents. The use of a relative offset (e.g., a displacement or an offset from a specified point or location) to calculate the address may provide a faster determination of the address. In this example, the replacement instructions use an offset relative to the position of the branch instruction or relative addressing. Instruction replacement program 121 may apply relative addressing or program-counter relative (PC-relative) addressing when the replacement instruction is functionally equivalent to the existing assembly language instructions, and when the existing assembly language instructions selected for replacement by the user. Use of a relative offset to calculate the address of a replacement instruction with greater addressing ranges that are provided by some updated or more recently released replacement instructions reduces the need for assembly language programs to allocate registers for addressing.

In another embodiment, instruction replacement program 121 may be configured to use a constant in the immediate field (i.e., a constant within the instruction) to replace the constant in memory when the size of the memory constant can be accommodated in the immediate field by an equivalent function instruction using fewer machine cycles. In this example, the use of one or more groups of instructions with a constant in memory where the necessary memory access may require many machine cycles, the use of a constant in the immediate field may be configured in instruction replacement program 121 to replace the constant in memory. Instruction replacement program 121 provides the user an option of selecting the replacement of a constant in memory when a constant in the immediate field, which requires fewer machine cycles to access. If the existing instructions using a constant in memory can all be converted to replacement instructions where the constant is a part of the immediate field of the instruction, then the constant can be eliminated, thus reducing the program size and increasing the program's efficiency.

The examples above use IBM® High Level Assembler Language to illustrate possible groups of instructions in an existing assembly language program that can be replaced using instruction replacement program 121. However, as will be recognized by one skilled in the art, instruction replacement program 121 can be configured or written for any other assembly languages using a similar instruction replacement process or a similar instruction replacement methodology.

FIGS. 2A, 2B and 2C depict examples of possible classes of existing instructions for selection by a user, in accordance with an embodiment of the present invention. Class 1, Class 2, and Class 3 are examples of classes or configured classes of instructions depicted as FIGS. 2A, 2B and 2C. Classes 1, 2, and 3 include existing instructions (From columns) which may be replaced with updated instructions (To columns) using instruction replacement program 121. Columns 201C, 202C, and 203C provide a brief description of the instructions.

An example of a class of instructions in an existing assembly language program that perform a similar function and can utilize increased function or capacity provided by updated computer processors are illustrated as Class 1 instructions in FIG. 2A. In an embodiment, as configured in instruction replacement program 121, a class of instructions such as Class 1 change or replace existing groups of instructions (e.g., in From column 201A) that use unsigned 12-bit displacements to the updated instructions (e.g., in To column 201B) that use signed 20-bit displacements. For example, Class 1 Instructions may include existing groups of instructions A, AH, AL, C, N, and NI having 12 bit unsigned displacements that may be replaced with instructions AY, AHY, ALY, CY, NY, and NIY with 20 bit signed displacements. In this example, instructions with mnemonics like A may be replaced with instructions with mnemonics like AY while retaining the same references to registers and operands in memory. Replacements as done with this class utilize improved capabilities of processors to provide increased functionality for the program.

In yet another embodiment, instruction replacement program 121 includes a configured class of instructions that eliminate unnecessary branch instructions. For example, existing groups of instructions depicted in Class 2 Instructions eliminate unnecessary branch instructions. In this example of a class of instructions, "c" represents a 4-bit value that tests for a successful branch condition. The branch condition may, for example, be "equal" if c=8, or "not equal" if c=7. Thus, "15-c" represents the complementary or opposite condition. In the two examples illustrated in FIG. 2A, the two complementary instructions in from column 202A may be replaced with one updated instruction in to column 202B. Class 2 Instructions in the first set of instructions (e.g., more than one instruction) are existing instructions "BC c,X" with "BC 15-c,Y", are configured to be replaced with "BC 15-c,Y". Similarly, the second set of complementary instructions, "BC c,X" with "BC 15,Y", may be replaced with instruction "BC 15-c,Y". For these examples, the two complementary branch instructions, the first of which skips over the second instruction to an immediately following third instruction, named X, that may be replaced with a single instruction thus, automatically simplifying and reducing the size of the program when selected by the user and processed using instruction replacement program 121.

In some embodiments, instruction replacement program 121 includes a configured class of instructions eliminating unnecessary register clearing. An example of a class of instructions eliminating unnecessary register clearing is depicted in Class 3 instructions in FIG. 2C. Existing assembly language programs may clear or subtract a 32-bit register from itself using "SR r,r" in From column 203A where SR is Subtract Register and r denotes a register before loading, using "LH r, Y" to load a 16 bit halfword in register r from Y (operand for a location in storage). As depicted in to column 203B the group of two instructions may be replaced with "LH r,Y" in an updated assembly language program.

Similarly, in the second replacement depicted in the Class 3 instruction example in FIG. 2C, the use of a group of two existing instructions, first "SR r,r", to clear the register and, then using "ICM r, B'0011', Y" in from column 203A. ICM is a mnemonic instruction for Insert Characters under Mask. Also included in from column 203A, r is a register and B'0011' indicates to insert 2 bytes into the rightmost 16 bits of the register. Y is an operand for a location in storage are replaced with a single instruction. When an updated processor is used, both instructions (SR and ICM) in from column 203A are replaced with "LLH r,Y" (Load Logical Halfword) in to column 203B. Groups of instructions within Class 3 have unnecessary register clearing (e.g., SR r,r) that may be eliminating with one or more replacement instructions incorporating or removing unnecessary register clearing thus, automatically simplifying or reducing program size and improving performance when selected by the user and executed for replacement by instruction replacement program 121.

Instruction replacement program 121 includes for each instruction or each group of instructions in a class of instructions, the replacement instruction, or the group of replacement instructions corresponding to or replacing the existing group of instructions and processing instructions for the existing group of instructions replacement. In an embodiment, instruction replacement program 121 sends and stores one or more of: a group of replacement instructions, and the processing instructions retrieved from persistent storage 508 in computer 130, to a database such as database 125 on server 120, or another computer (not shown). In various embodiments, the replacement instructions and the processing instructions for replacing the group of existing instructions are included in instruction replacement program 121.

For example, the processing instructions for Class 1, illustrated in FIG. 2A are shown below. In the instructions for this class, no instruction-operand analysis is required. In this example, groups of instructions in this class may be processed with an instruction routine as follows in Table 5 depicted below.

TABLE 5

Instruction Routine for Class 1

If Instruction has a replacement candidate (e.g., A, the ADD instruction)
    Then Create replacement statement (e.g., replace A with AY)
        Indicate replacement done
    Else Indicate no replacement done
EndIf
GoTo Completion processing However, if the group of instructions is a member of a class of instructions such as a based branch to relative-immediate (e.g., "BC 8,X" replaced with "JE X") as discussed earlier, the replacement cannot be applied to an existing instruction that is indexed. In the processing instructions for this class, it is necessary to test whether the existing group of instructions is indexed. For example, a processing routine for this class of instructions could be as follows in Table 6 depicted below.

TABLE 6

Figure 3:
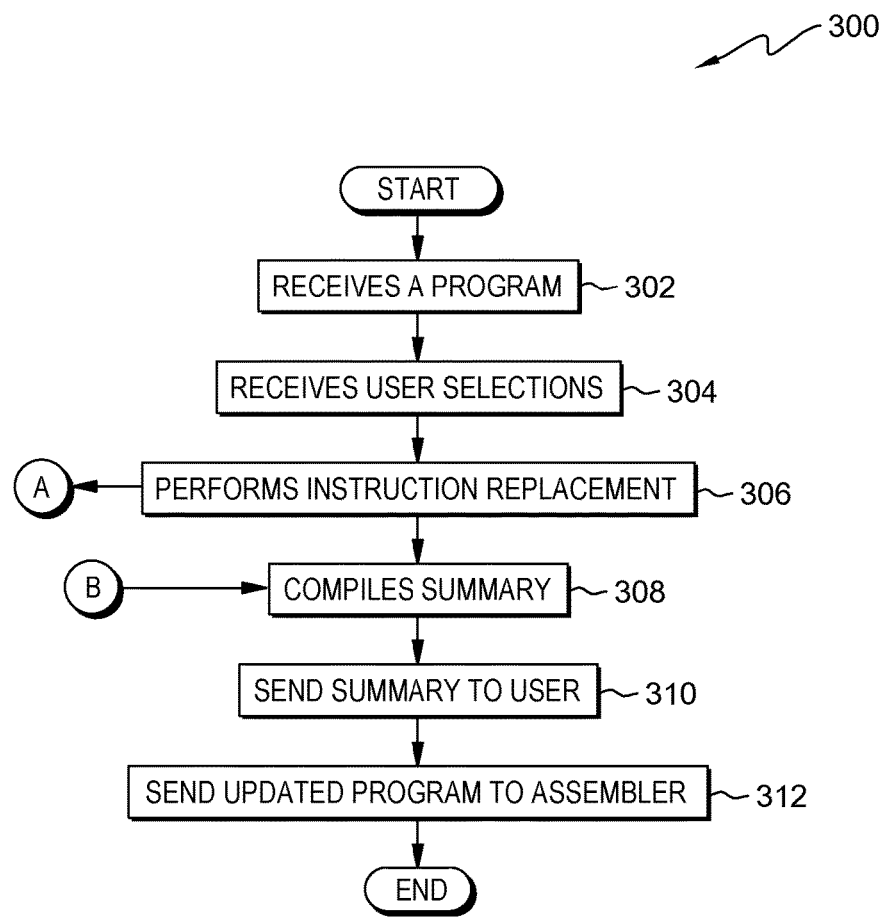
FIG. 3 is a flowchart depicting operational steps of an instruction replacement program, on a server within the distributed data processing environment of FIG. 1, for automatically and selectively updating an existing assembly language program, in accordance with an embodiment of the present invention.

Instruction Routine for a class of based
branch to relative-immediate instructions If Instruction has a replacement candidate
    Then If instruction is indexable
        Then If indexing field is nonzero
            Then indicate no replacement done
                Issue explanatory message
                GoTo completion processing
        EndIf
    EndIf
    Else Indicate no replacement done
        GoTo completion processing
EndIf
Create replacement statement (e.g., replace BC 8,X with JE X)
Indicate replacement done
GoTo processing complete FIG. 3 is a flowchart 300 depicting operational steps of instruction replacement program 121, on server 120 within distributed data processing environment 100, for automatically and selectively updating an existing assembly language program, in accordance with an embodiment of the present invention. While the examples provided to describe the method, the process, and techniques for the creation of an updated assembly language program through the execution of instruction replacement program 121 are presented using one assembly language for one assembler, as known to one skilled in the art, the concepts, the method, and embodiments depicted may be executed by instruction replacement program 121 for any assembly language program using appropriate codes, routines and instructions for that assembly language and associated assembler.

Instruction replacement program 121 receives a program (302). In an exemplary embodiment, instruction replacement program 121 receives an existing assembly language program. The existing assembly language program, which may be written for processor technology that is not the most recent processor technology (e.g., a back level processor or a previous generation processor), is sent to instruction replacement program 121 by a user from UI 135 on computer 130 or other computing device (not shown in FIG. 1). In one embodiment, instruction replacement program 121 receives assembly language code, which may be a line of code, a routine, or a subset of an assembly language program from a user on UI 135 via network 110. For example, a subset of an assembly language program may be sent to instruction replacement program 121 for instruction replacement. The assembly language may be in any type of assembly language compatible with instruction replacement program 121 and assembler 123.

Instruction replacement program 121 receives user selections (304). Instruction replacement program 121 receives from UI 135 a user selection of one or more classes of instructions for replacement. Instruction replacement program 121 may also receive the user selection of one or more groups of instructions in the class of instructions for replacement. When instruction replacement program 121 receives a user selection of one or more groups of instructions in a class of instructions selected for replacement, instruction replacement program 121 replaces only the selected groups of instructions in the selected class for replacement. For example, instruction replacement program 121 receives a selection of a class of instructions for replacement where a user may select to replace one or more groups of instructions in the class of instructions using UI 135 on computer 130. The user may select an icon, select an item in a pull-down menu, a pop-up menu, or enter a command to select classes and instructions for replacement. The selected classes and/or the selected group of instructions are sent from computer 130 to instruction replacement program 121 on server 120 when the user completes selections. In an embodiment, when the user executes instruction replacement program 121 without a user selection of a class of instructions, then instruction replacement program 121 executes the instruction replacement for all the classes and all of the groups of instructions.

In one embodiment, instruction replacement program 121 displays the instructions in the class of existing instructions to be replaced to the user. In another embodiment, instruction replacement program 121 displays to the user the replacement instructions associated to the selected instructions in the one or more selected classes of instructions.

In various embodiments, instruction replacement program 121 receives a summary selection from the user on UI 135 on computer 130. A user may select a number of types of summaries of the instruction replacements made when instruction replacement program 121 is run to update an existing assembly language program. Instruction replacement program 121 may be configured to provide a number of different types of summaries on instruction replacement. The user may select summary options from UI 135 on computer 130. For example, a pull down menu, icons, or other similar method of user selection of summary options such as "successful replacement summary" or "program size change after replacement" may be used by the user to input one or more summary selections on UI 135 received by instruction replacement program 121 via network 110.

In an embodiment, instruction replacement program 121 provides a summary option for a user to select that identifies which existing group of instructions were replaced, the replacement instruction used, the location where the replacements occurred, and the total number of replacements. A similar summary may be provided to identify selected existing groups of instructions for replacement where replacements did not occur. For example, existing instruction EX (Execute) is selected for replacement with EXRL (Execute Relative Long). EXRL can only be used for a replacement when there is index field if the index field contents are zero. In this example, the selected summary of successful and unsuccessful replacements may state that EX was replaced in five selected existing instructions but not replaced in eleven other selected existing instructions. In an embodiment, instruction replacement program 121 provides an explanation of why an instruction replacement is not successful. For example, eleven groups of instructions were not replaced due to the presence of an index. In another embodiment, instruction replacement program 121 can provide summaries of successful and unsuccessful instruction replacements by classes (e.g., Class 2C has 18 successful and 7 unsuccessful replacements).

In another embodiment, instruction replacement program 121 is configured to provide a summary with a program listing of instruction replacements. For example, the program listing may include the list of one or more groups of instructions replaced followed by the corresponding list of one or more replacement instructions that replaced the existing group of instructions. If this option for a summary is selected by the user, the summary in this case, could include the program listing with the user selected class, the user selected existing instructions, which may be an instruction or a set of instructions and the replacement instructions. For example, an existing group of instructions replaced may be included in a program listing with a location, the one or more replacement instructions, and a comment such as "replaced instruction", "replaced group of instructions", or "replaced Class 2A instruction". In some embodiments, the group or the one more instructions replacing the existing group of instructions may be included after the selected, existing group of instructions with information on a location of the replaced one or more instructions, the one or more replacement instructions, and a comment such as "replacement instruction".

In yet another embodiment, instruction replacement program 121 is configured to provide a summary selection to display the change in the program size as a result of executing instruction replacement program 121. For example, if the user was to select a summary option such as "program size", the user may receive from instruction replacement program 121 a summary stating program size before instruction replacement and program size after instruction replacement. Upon executing instruction replacement program 121 when "program size" is selected by the user, instruction replacement program 121 may send to computer 130 a file for display or a pop-up on which displays to the user on UI 135 "Program size before instruction replacement: 23456 bytes and program size after instruction replacement: 23328 bytes" for example.

The user selections are sent via network 110 to instruction replacement program 121 on server 120. In an embodiment, the user stores the selections for summaries and selections of one or more classes of instruction for replacement to persistent storage 508 in computer 130. In various embodiments, instruction replacement program 121 sends the user selections of one or more classes of instructions and replacement summary selections to database 125 on server 120.

Instruction replacement program 121 performs instruction replacement (306) using a replacement routine A that is included in instruction replacement program 121. The details of instruction replacement performed by instruction replacement program 121 in routine A are discussed in detail later in FIG. 4.

Instruction replacement program 121 compiles a summary (308). Using the user selections of desired instruction replacement summary information provided in Step 304, instruction replacement program 121 compiles the replacements made to the existing assembly language program. Instruction replacement program 121 summarizes the user requested information on the one or more instruction replacements made to update the existing assembly language program. For example, the summary can include the number of existing groups of instructions replaced in the original or existing assembly language program. The selected replacements to the existing groups of instructions update or allow the existing assembly language program to be upgraded to utilize updated or new functions and capabilities provided by more recent technologies (i.e., updated computer processors and/or new assembly language). Upon compiling the summary, instruction replacement program 121 sends the summary to the user (310). The summary is sent via network 110 to a user on a client device such as computer 130. In the event that no summary information is requested by the user, instruction replacement program 121 sends the updated program directly to assembler 123.

After sending the selected summary information on the instruction replacements to the user, instruction replacement program sends the updated program to assembler 123 (312) where the updated assembly language program will be assembled.

Figure 4:
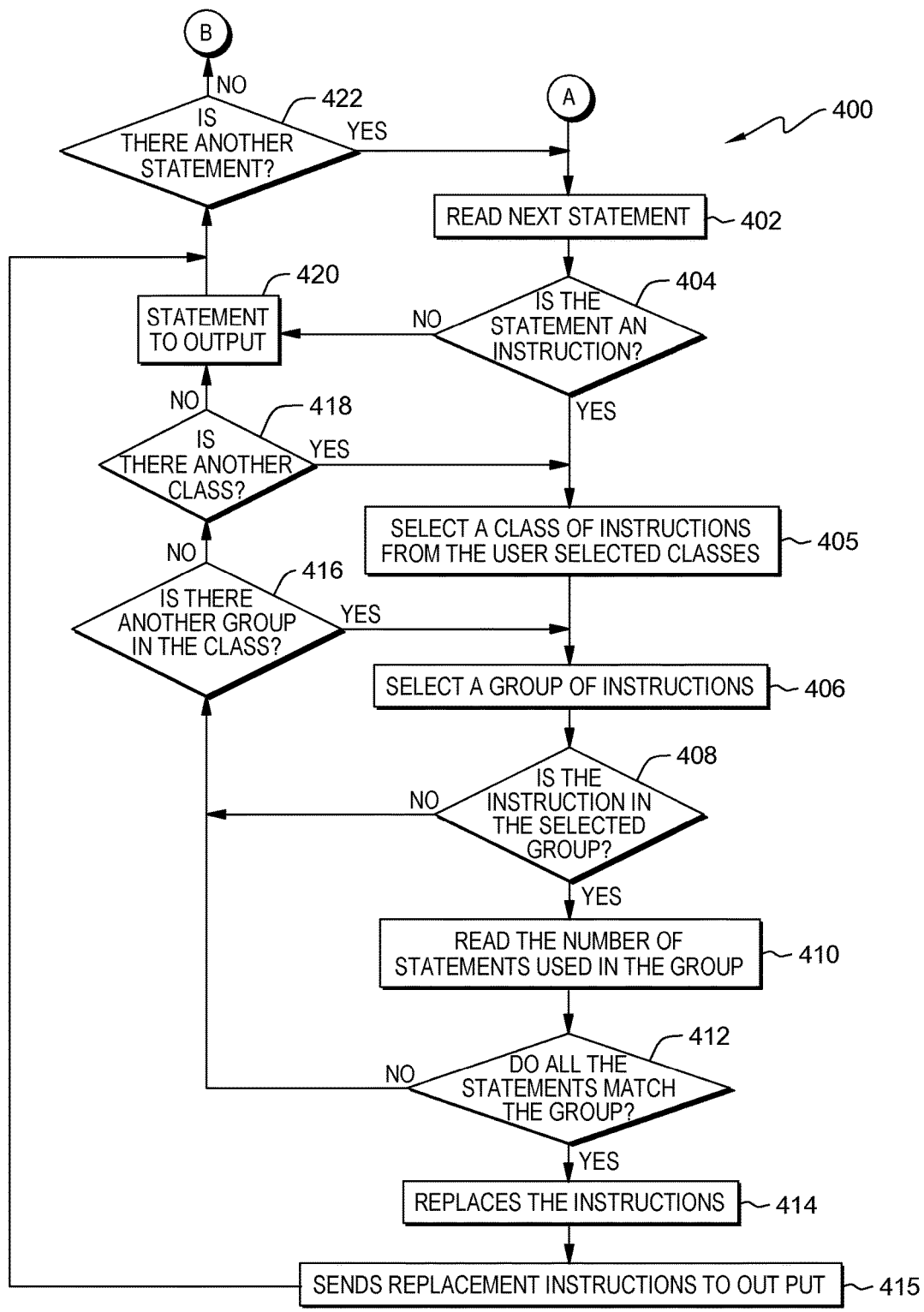
FIG. 4 is a flowchart depicting operational steps of a replacement routine A in the instruction replacement program, on a server within the distributed data processing environment of FIG. 1, for evaluating groups of instructions for replacement in an existing assembly language program, in accordance with an embodiment of the present invention.

FIG. 4 is a flowchart 400 depicting operational steps of a replacement routine A in instruction replacement program 121, on a server 120 within the distributed data processing environment 100 of FIG. 1, for evaluating groups of instructions for replacement in an existing assembly language program, in accordance with an embodiment of the present invention.

Instruction replacement program 121 reads a statement (402). A statement is a line of code in an assembly language program that is used as a source for instruction replacement program 121. Instruction replacement program 121 reads the first or the next statement from a received line in a section of code such as a routine in an assembly language program, or a received assembly language program. Instruction replacement program 121 determines if the statement is an instruction (decision 404). Instruction replacement program 121 determines if the code in the statement matches known instruction formats for the assembly language where the code may include instruction mnemonics (opcode) and data location (operand). If the code does not match known instruction formats or is not an instruction (no branch, decision 404), then instruction replacement program 121 passes the statement to output (420). An output from step 420 is used as an output of instruction replacement program 121 where the output is to be included in the updated assembly language program. After sending the statement to output, instruction replacement program 121 returns to the received existing assembly language program to determine if there is another statement (decision 422). If instruction replacement program 121 determines that there is not another statement (no branch, 422) then, instruction replacement program 121 returns step 308 in FIG. 3 as shown by arrow B and replacement routine A is completed for the existing assembly language program.

However, if there is another statement (yes branch, 422), instruction replacement program 121 reads the statement (402) and determines if the statement is an instruction (decision 404). If the statement matches the instruction format for the assembly language (yes branch, 404), then instruction replacement program 121 selects a class of instructions from the user selected classes (405).

Upon selecting a class of instructions for evaluation, instruction replacement program 121 selects a group of instructions (406) from the selected class of instructions. Then, instruction replacement program 121 determines if the instruction is in the selected group (decision 408). If the code in the instruction does not match the code in the first instruction in the selected group of instructions (no branch, decision 408), then instruction replacement program 121 determines if there is another group in the class (decision 416). Instruction replacement program 121 checks the selected class of instructions to determine if there is another group of instructions in the selected class. If there is another group of instructions in the selected class of instructions that has not been tested (yes branch, decision 416), then instruction replacement program 121 selects a group of instructions (406) and proceeds to test if next group of instructions for replacement (e.g., repeating steps 408 to 416).

However, if the instruction replacement program 121 determines that the instruction matches the code in the first instruction in the selected group of instructions (yes branch, decision 408) then, instruction replacement program 121 reads the number of statements used in the group (410). Instruction replacement program 121 reads the next number of statements that would be needed to match the group of instructions in the selected group. For example, if the group of instructions consists of three instructions, then instruction replacement program 121 will read the next two statements (i.e., has read all three statements corresponding to the three instructions in the group.

Instruction replacement program 121 determines if all the instructions match the group (decision 412). Instruction replacement program 121 tests the number of read statements that would be needed to match the selected group of instructions. If the code in all of the read statements matches the code in the selected group of instructions (yes branch, decision 412), then instruction replacement program 121 replaces the group of instructions (414). Instruction replacement program 121 replaces the group of instructions that match a selected group of instructions in a selected class of instructions with the associated replacement instructions as pre-configured in instruction replacement program 121. The selected group of instructions in the existing assembly language program are replaced with the corresponding replacement instructions for inclusion in the updated assembly language program. Instruction replacement program 121 sends replacement instructions to output (415). The one or more instructions that replace the selected group of instructions in the existing or original assembly language program are sent to output for inclusion in the updated assembly language program. Upon sending the group of replacement instructions to output, instruction replacement program 121 checks to determine if there is another statement (422).

However, when instruction replacement program 121 reads the number of statements used in the group and determines that all the statements do not match the instructions in the group (no branch, decision 412) then, instruction replacement program 121 proceeds to determine if there is another group (decision 416). If instruction replacement program 121 determines that there is not another selected group of instructions in the selected class of instructions (no branch, decision 416) then, instruction replacement program 121 determines if there is another class (decision 418). If there is another class of instructions in the user selected classes of instructions (yes branch, 418), then instruction replacement program 121 proceeds to select a class of instructions from the user selected classes (405), and to select a group of instructions (406) from the another or next class of user selected classes of instructions and proceeds to test if the code in the instruction matches the code of an instruction in the selected group to determine or test if the instruction is in the selected group of instructions (e.g., follows the process described above for steps decision step 408 through decision step 418).

However, if instruction replacement program 121 determines that there is not another class (no branch, decision 418) in the user selected classes, then instruction replacement program 121 sends the statement, which may be an instruction, to output. Instruction replacement program 121 determines if there is another statement (decision 422). If there is another statement (yes branch, decision 422) then, instruction replacement program 121 reads the next statement (402) and proceeds to test the statement for replacement as discussed above in steps 404 to 422. However, if instruction replacement program 121 determines that there is not another statement (no branch, decision 422), the replacement routine A is complete and instruction replacement program 121 returns to FIG. 3 to compile the summary (308).

Figure 5:
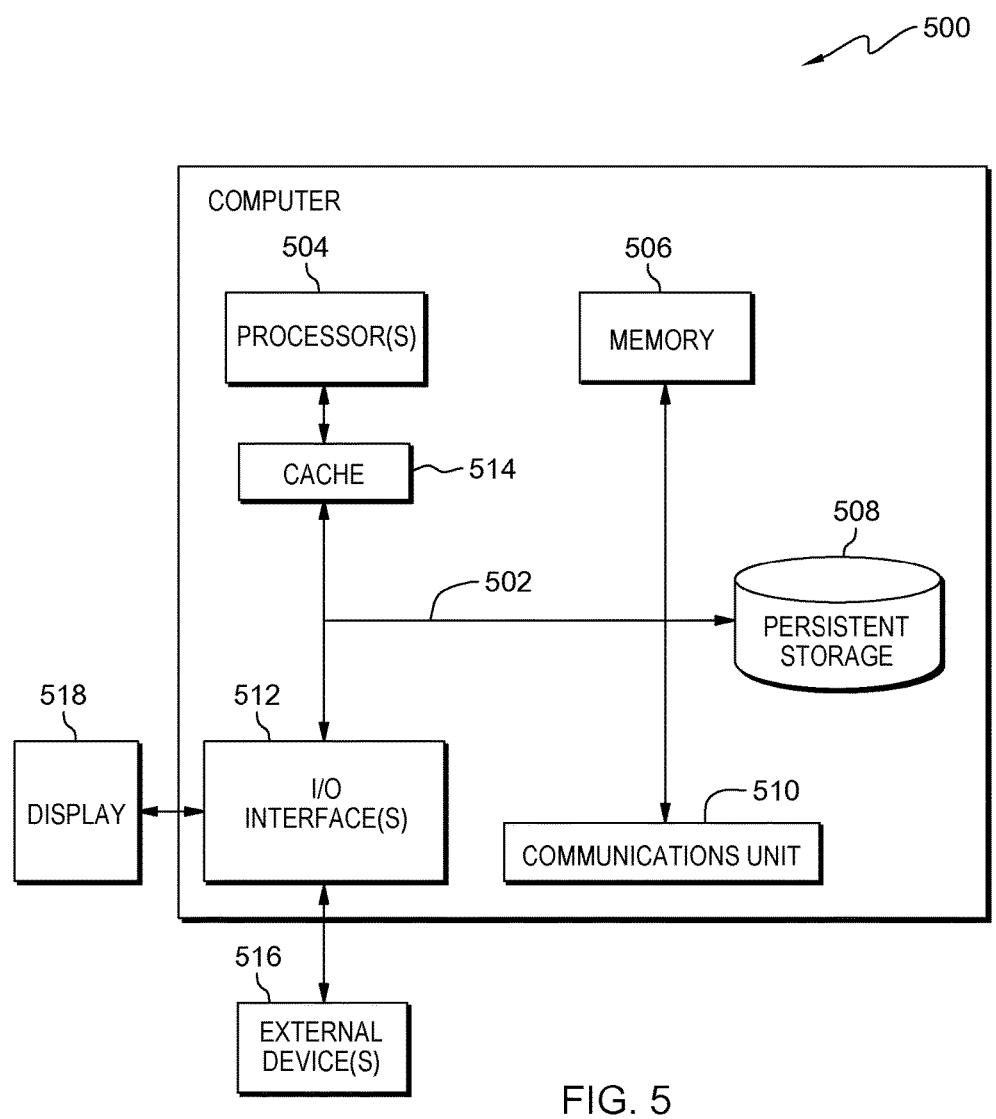
FIG. 5 depicts a block diagram of components of a computer system, which is an example of a system such as the server within the distributed data processing environment of FIG. 1, in accordance with an embodiment of the present invention.

FIG. 5 depicts a block diagram 500 of components of a computer system, which is an example of a system such as server 120 within distributed data processing environment 100, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Server 120 includes processor(s) 504, cache 514, memory 506, persistent storage 508, communications unit 510, input/output (I/O) interface(s) 512, and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506.

Program instructions and data used to practice embodiments of the present invention are stored in persistent storage 508 for execution and/or access by one or more of the respective processor(s) 504 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is part of persistent storage 508.

Communications unit 510, in these examples, provides for communications with other data processing systems or devices, including resources of server 120, computer 130, and other computing devices not shown in FIG. 1. In these examples, communications unit 510 includes one or more network interface cards. Communications unit 510 may provide communications with either or both physical and wireless communications links. Program instructions and data used to practice embodiments of the present invention may be downloaded to persistent storage 508 through communications unit 510.

I/O interface(s) 512 allows for input and output of data with other devices that may be connected to server 120. For example, I/O interface(s) 512 may provide a connection to external device(s) 516 such as a keyboard, a keypad, a touch screen, a microphone, a digital camera, and/or some other suitable input device. External device(s) 516 can also include portable computer readable storage media, for example, devices such as thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor. Display 518 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application, or technical improvement over technologies found in the marketplace, or to enable others of ordinary skill in the art to understand the embodiments disclosed herein.

What is claimed is:

1. A method for replacement of instructions in an assembly language program, the method comprising:
receiving, by one or more computer processors, for an assembly language program, a user selection of one or more classes of instructions for replacement and a user selection of one or more summaries of the replacement of instructions in the assembly program upon a completion of the replacement of instructions in the assembly language program,
wherein a class of instructions includes one or more groups of instructions performing similar functions on a processor architecture to be replaced and one or more replacement instructions corresponding to each group of instructions of the one or more groups of instructions to be replaced;
reading, by one or more computer processors, a number of statements including the statement that match a number of instructions in a first group of instructions in a user selected class of instructions in the one or more user selected classes of instructions for replacement;

replacing, by one or more computer processors, the first group of instructions with the one or more replacement instructions corresponding to the first group of instructions in the user selected class of instructions when the read number of statements match the number of instructions in the first group of instructions and each of the statements in the read number of statements match a corresponding instruction in the first group of instructions;

replacing, by one or more computer processors, each group of the one or more groups of instructions in the one or more classes of instructions for replacement with the one or more replacement instructions corresponding to each group of instructions in each class of the user selected one or more classes of instructions for replacement and including a comment associated with each of the one or more replacement instructions to update the assembly language program; and in response to completing the replacement of instructions in the assembly language program, providing, by one or more computer processors, at least, a number of each group of instructions replaced, a number of replacements of the one or more groups of instructions in each class of the one or more classes of instructions for replacement, and a location for each group of instructions replaced.

2. The method of claim 1, wherein receiving, for the assembly language program, the user selection of the one or more classes of instructions for replacement comprises:

receiving, by one or more computer processors, for at least one of the one or more user selected classes of instruction for replacement a user selection of one or more groups of instructions for replacement in the user selected class of instructions, wherein only the user selected one or more groups of instructions in the at least one of the one or more user selected of instructions will be replaced.

3. The method of claim 1, further comprising:

reading, by one or more computer processors, a next statement in the assembly program;

determining, by one or more computer processors, the next statement is not an instruction in the first group of instructions;

determining, by one or more computer processors, whether the next statement is an instruction in one group of the one or more groups of instructions in the user selected class of instructions;

responsive to determining that the next statement is not an instruction in one group of the one or more groups of instructions in the user selected class of instructions, determining, by one or more computer processors, that there is a second user selected class of instructions of the one or more user selected classes of instructions for replacement; and determining, by one or more computer processors, whether the next statement is an instruction in a group of instructions in the second user selected class of instructions of the one or more user selected classes of instructions for replacement.

4. The method of claim 1, wherein the one or more summaries of the replacement of instructions in the assembly program upon a completion of the replacement of instructions in the assembly language program includes at least a summary of a replacement location in the assembly language program for each group of the one or more groups of instructions replaced with the one or more replacement instructions corresponding to each group of the one or more groups of instructions replaced, a summary indicating a size of the assembly language program before the replacement of each of the one or more groups of instructions to be replaced in the one or more user selected classes of instruction, and a summary indicating and a summary indicating a change in a size of the assembly language program-after the replacement of instructions.

5. The method of claim 1, wherein the class of instructions includes one or more processing instructions for instruction replacement.

6. The method of claim 1, wherein replacing the first group of instructions with the one or more replacement instructions associated with each of the one of more instructions in the first group of instructions provides at least one of the following abilities: to simplify existing assembly language instructions and to use more recent assembly language instructions.

7. A computer program product for replacement of instructions in an assembly language program, the computer program product comprising:

one or more computer readable storage media and program instructions stored on the one or more computer readable storage media, the program instructions executable by a processor, the program instructions comprising:

program instructions to receive, for an assembly language program, a user selection of one or more classes of instructions and a user selection of one or more summaries of the replacement of instructions in the assembly program upon a completion of the replacement of instructions in the assembly language program, wherein a class of instructions includes one or more groups of instructions performing similar functions on a processor architecture to be replaced and one or more replacement instructions corresponding to each group of instructions of the one or more groups of instructions to be replaced;

program instructions to read a number of statements including the statement that match a number of instructions in a first group of instructions in a user selected class of instructions in the one or more user selected classes of instructions for replacement;

program instructions to replace the first group of instructions with the one or more replacement instructions corresponding to the first group of instructions in the user selected class of instructions when the read number of statements match the number of instructions in the first group of instructions and each of the statements in the read number of statements match a corresponding instruction in the first group of instructions;

program instructions to replace each group of the one or more groups of instructions in the one or more classes of instructions for replacement with the one or more replacement instructions corresponding to each group of instructions in each class of the user selected one or more classes of instructions for replacement and including a comment associated with each of the one or more replacement instructions to update the assembly language program; and in response to completing the replacement of instructions in the assembly language program, program instructions to provide, at least, a number of each group of instructions replaced, a number of replacements of the one or more groups of instructions in each class of the one or more classes of instructions for replacement, and a location for each group of instructions replaced.

8. The computer program product of claim 7, wherein receiving, for the assembly language program, the user selection of the one or more classes of instructions for replacement comprises:
program instructions to receive for at least one of the one or more user selected classes of instruction for replacement and a user selection of one or more groups of instructions for replacement in the user selected class of instructions, wherein only the user selected one or more groups of instructions in the at least one of the one or more user selected of instructions will be replaced.

9. The computer program product of claim 7, further comprising:
program instructions to read a next statement in the assembly program;
program instructions to determine the next statement is not an instruction in the first group of instructions;
program instructions to determine whether the next statement is an instruction in one group of the one or more groups of instructions in the user selected class of instructions;
responsive to determining that the next statement is not an instruction in one group of the one or more groups of instructions in the user selected class of instructions of the one or more user selected class of instructions, program instructions to determine that there is a second user selected class of instructions of the one or more user selected classes of instructions for replacement; and
program instructions to determine whether the next statement is an instruction in a group of instructions in the second user selected class of instructions of the one or more user selected classes of instructions for replacement.

10. The computer program product of claim 7, wherein the one or more summaries of the replacement of instructions in the assembly program upon a completion of the replacement of instructions in the assembly language program includes at least a summary of a replacement location in the assembly language program for each group of the one or more groups of instructions replaced with the one or more replacement instructions corresponding to each group of the one or more groups of instructions replaced, a summary indicating a size of the assembly language program before the replacement of each of the one or more groups of instructions to be replaced in the one or more user selected classes of instruction, and a summary indicating a change in a size of the assembly language program after the replacement of instructions.

11. The computer program product of claim 7, wherein the class of instructions includes one or more processing instructions for instruction replacement.

12. A computer system for replacement of instructions in an assembly language, the computer system comprising:
one or more computer processors;
one or more computer readable storage media;
program instructions stored on the one or more computer readable storage media for execution by at least one of the one or more processors, the program instructions comprising:
program instructions to receive, for an assembly language program, a user selection of one or more classes of instructions and a user selection of one or more summaries of the replacement of instructions in the assembly program upon a completion of the replacement of instructions in the assembly language program,
wherein a class of instructions includes one or more groups of instructions performing similar functions on a processor architecture to be replaced and one or more replacement instructions corresponding to each group of instructions of the one or more groups of instructions to be replaced;
program instructions to read a number of statements including the statement that match a number of instructions in a first group of instructions in a user selected class of instructions in the one or more user selected classes of instructions for replacement;
program instructions to replace the first group of instructions with the one or more replacement instructions corresponding to the first group of instructions in the user selected class of instructions when the read number of statements match the number of instructions in the first group of instructions and each of the statements in the read number of statements match a corresponding instruction in the first group of instructions;
program instructions to replace each group of the one or more groups of instructions in the one or more classes of instructions for replacement with the one or more replacement instructions corresponding to each group of instructions in each class of the user selected one or more classes of instructions for replacement and including a comment associated with each of the one or more replacement instructions to update the assembly language program; and
in response to completing the replacement of instructions in the assembly language program, program instructions to provide, at least, a number of each group of instructions replaced, a number of replacements of the one or more groups of instructions in each class of the one or more classes of instructions for replacement, and a location for each group of instructions replaced.

13. The computer system of claim 12, wherein receiving, for the assembly language program, the user selection of the one or more classes of instructions for replacement comprises:
program instructions to receive for at least one of the one or more user selected classes of instruction for replacement a user selection of one or more groups of instructions for replacement in the user selected class of instructions, wherein only the user selected one or more groups of instructions in the at least one of the one or more user selected of instructions will be replaced.

14. The computer system of claim 13, wherein the one or more summaries of the replacement of instructions in the assembly program upon a completion of the replacement of instructions in the assembly language program includes at least a summary of a replacement location in the assembly language program for each group of the one or more groups of instructions replaced with the one or more replacement instructions corresponding to each group of the one or more groups of instructions replaced, a summary indicating a size of the assembly language program before the replacement of each of the one or more groups of instructions to be replaced in the one or more user selected classes of instruction, and a summary indicating and a summary indicating a change in a size of the assembly language program after the replacement of instructions.

15. The computer system of claim 12, wherein the class of instructions includes one or more processing instructions for instruction replacement.

16. The method of claim 1, wherein receiving, for the assembly language program, the user selection of the one or more classes of instructions includes receiving, from the user, a selection of a processor architecture on which the assembly language program will run to determine the one or more replacement instructions corresponding to the one or more groups of instructions to be replaced.

17. The method of claim 1, wherein replacing the first group of instructions with the one or more replacement instructions corresponding to the first group of instructions in the user selected class of instructions when the read number of statements match the number of instructions in the first group of instructions and each of the statements in the read number of statements match a corresponding instruction in the first group of instructions includes using an instruction routine for instruction replacement of instructions in the user class of instructions.

18. The method of claim 1, wherein the user selection of one or more summaries of the replacement of instructions in the assembly program upon a completion of the replacement of instructions in the assembly language program comprises:
   determining, by one or more computer processors, that a group of instructions of the one or more groups of instructions of the one or more classes of instruction for replacement does not pass a required test for replacement, wherein the determining the group of instructions does not pass the required test for replacement is based on processing instructions associated with each class of instructions of the one or more classes of instruction for replacement, and
   providing, by one or more computer processors, a number of each group of instructions in the one or more classes of instructions for replacement that does not pass a required test for replacement and were not replaced.

19. The method of claim 1, wherein the one or more summaries of the replacement of instructions in the assembly program includes a program listing of instruction replacements that includes identifying each group of the one or more groups of instructions replaced with the one or more groups of instructions for replacement and identifying each group of the one or more groups of instructions in the one or more classes of instructions for replacement that was not replace with a comment identifying a reason why the group of instructions was not replaced.

20. The method of claim 1, wherein receiving for an assembly language program, a user selection of one or more classes of instructions for replacement includes receiving a user selection of one or more groups of instructions in the one or more classes of instructions for replacement wherein one or more groups of instructions in the one or more classes of instructions not selected are not replaced.

\* \* \* \* \*